United States Patent
Galdeano Castillo et al.

(10) Patent No.: US 12,059,844 B2
(45) Date of Patent: Aug. 13, 2024

(54) PRESSURE-REGULATING APPARATUS FOR THREE-DIMENSIONAL PRINTER

(71) Applicant: Hewlett-Packard Development Company, L.P., Spring, TX (US)

(72) Inventors: Eduard Galdeano Castillo, Sant Cugat del Valles (ES); Guillermo Moliner Clemente, Sant Cugat del Valles (ES); Alejandro Torres Pinero, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 202 days.

(21) Appl. No.: 17/414,090

(22) PCT Filed: Aug. 29, 2019

(86) PCT No.: PCT/US2019/048853
§ 371 (c)(1),
(2) Date: Jun. 15, 2021

(87) PCT Pub. No.: WO2021/040723
PCT Pub. Date: Mar. 4, 2021

(65) Prior Publication Data
US 2022/0176634 A1 Jun. 9, 2022

(51) Int. Cl.
*B29C 64/386* (2017.01)
*B29C 64/364* (2017.01)
(Continued)

(52) U.S. Cl.
CPC .......... *B29C 64/386* (2017.08); *B29C 64/364* (2017.08); *B33Y 40/00* (2014.12); *B33Y 50/00* (2014.12); *G05D 16/2013* (2013.01)

(58) Field of Classification Search
CPC ... B29C 64/364; B29C 64/386; B29C 64/393; G05D 16/2013; F16K 3/24; F16K 3/265; F16K 11/07
See application file for complete search history.

(56) References Cited

U.S. PATENT DOCUMENTS 3,612,100 A * 10/1971 Kapeker ............. F16K 11/0565
137/589
5,312,297 A * 5/1994 Dieckert ............... B08B 15/023
454/238
(Continued)

FOREIGN PATENT DOCUMENTS

CN 205614054 U 10/2016
DE 102016100058 A1 7/2017
(Continued)

*Primary Examiner* — Reinaldo Sanchez-Medina
(74) *Attorney, Agent, or Firm* — Shook, Hardy & Bacon L.L.P.

(57) ABSTRACT

An apparatus for regulating pressure in a three-dimensional printer comprises a controller and a connector. The controller is configured to receive a value of a measured pressure within the three-dimensional printer. The connector is connectable between a gas outlet of the printer and an inlet of an external gas extraction system. The controller is configured to compare the received value of measured pressure with a predetermined value. If the received value differs from the predetermined value, the controller is configured to permit ambient air to flow into the external extraction system.

11 Claims, 3 Drawing Sheets

(51) Int. Cl.
  *B33Y 40/00*   (2020.01)
  *B33Y 50/00*   (2015.01)
  *G05D 16/20*   (2006.01)

(56) References Cited

U.S. PATENT DOCUMENTS

| | | | | |
|---|---|---|---|---|
| 5,385,505 | A * | 1/1995 | Sharp | G05D 16/2053 |
| | | | | 454/238 |
| 5,669,410 | A * | 9/1997 | Furuya | A01K 63/042 |
| | | | | 137/511 |
| 6,221,160 | B1 * | 4/2001 | Lin | B05C 15/00 |
| | | | | 454/238 |
| 6,267,131 | B1 * | 7/2001 | Masada | G05D 16/2013 |
| | | | | 137/12 |
| 6,414,828 | B1 | 7/2002 | Zimmerman et al. | |
| 7,954,431 | B2 | 6/2011 | Jung et al. | |
| 8,647,706 | B2 * | 2/2014 | Yamazaki | H10K 71/18 |
| | | | | 427/428.01 |
| 9,433,809 | B2 | 9/2016 | Bildstein et al. | |
| 10,814,504 | B2 * | 10/2020 | Parrenin | G05D 16/2053 |
| 11,331,858 | B2 * | 5/2022 | Eideloth | B33Y 40/10 |
| 11,524,460 | B2 * | 12/2022 | Zamorano | B22F 12/70 |
| 2006/0117771 | A1 | 6/2006 | Fujimori et al. | |
| 2009/0206290 | A1 * | 8/2009 | Wygnanski | F16K 31/047 |
| | | | | 251/129.15 |
| 2013/0252537 | A1 | 9/2013 | Wiley et al. | |
| 2017/0321404 | A1 * | 11/2017 | Wiwi | F16K 3/0281 |
| 2018/0326665 | A1 | 11/2018 | Gatenholm et al. | |
| 2018/0361034 | A1 * | 12/2018 | Tobien | F16K 31/5245 |

FOREIGN PATENT DOCUMENTS

| | | |
|---|---|---|
| WO | WO-2017196383 A1 | 11/2017 |
| WO | WO-2018005439 A1 | 1/2018 |
| WO | WO-2018128695 A2 | 7/2018 |

* cited by examiner

PRESSURE-REGULATING APPARATUS FOR THREE-DIMENSIONAL PRINTER

BACKGROUND

A three-dimensional printer may generate a three-dimensional object within a printing chamber. During the printing process, gas flows may be generated within the printing chamber. The printing chamber may have an air inlet and an air outlet, wherein gas flows generated during the printing process may exit through the air outlet.

A three-dimensional printer may be connected to a gas extraction system, for evacuating the gas flows from the printing chamber. The gas extraction system may be an existing system provided in a building, and one or more printers may be connected to the same existing gas extraction system.

DETAILED DESCRIPTION

In an example three-dimensional printing method, a three-dimensional object may be generated in a build chamber that may be provided within the three-dimensional printer. During the printing process, exhaust gases may be generated. The printer may comprise a gas outlet through which the exhaust gases may exit the build chamber during the printing process. The exhaust gases may include water vapor and other gases which may exit the build chamber.

The three-dimensional printer may be connected to an external gas extraction system, for example an external gas extraction system installed in a building. The external gas extraction system may extract exhaust gases from the printer. In use, there may be a plurality of printers connected to the same external gas extraction system. The rate at which an external gas extraction system extracts gas from a printer may vary according to the number of printers connected to the gas extraction system. In addition, the rate at which a gas extraction system extracts gas from a printer may vary over time. Different external gas extraction systems may extract gas at different rates.

Variations in the rate at which a gas extraction system extracts gas may affect a pressure within the build chamber, or other portion, of the printer. During the printing process, the pressure within the build chamber may affect the quality of the printed objects and the efficiency of the printer. If the rate of exhaust gases exiting the build chamber is too high, the pressure within the build chamber may be lowered, and there may be unexpected gas flows within the build chamber, which may directly or indirectly cause damage to the printed parts. For example, a change in gas flow may modify a carefully controlled temperature within a build chamber.

Examples described herein may enable a pressure to be regulated within a three-dimensional printer, when the three-dimensional printer is connected to an external extraction system having a varying rate of gas extraction. Examples described herein may also enable a pressure to be regulated within a three-dimensional printer, when the three-dimensional printer is connected to different external gas extraction systems having different rates of gas extraction or is connected to an external gas extraction system having a rate of gas extraction that is higher than the printer is designed to cope with.

Figure 1:
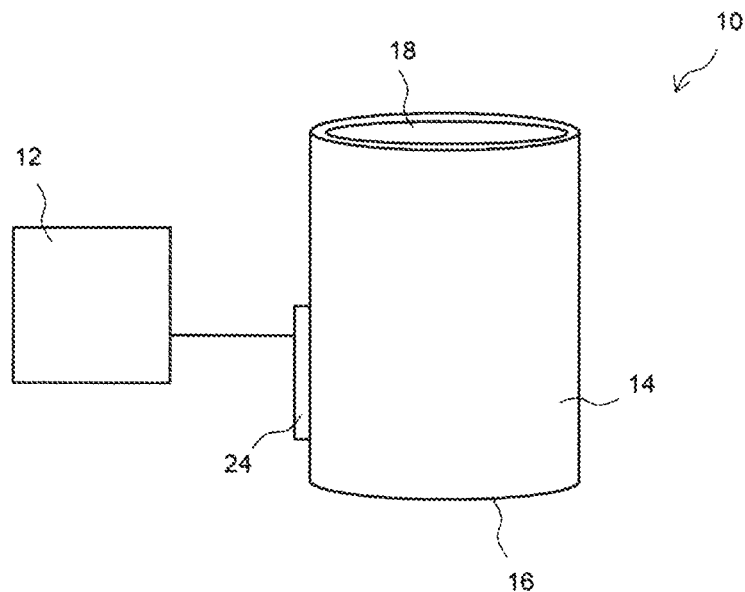
FIG. 1 is an illustration of an example apparatus for regulating pressure.
Figure 2:
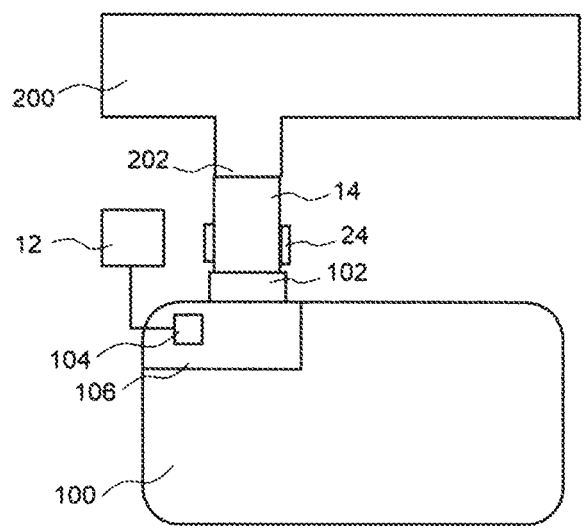
FIG. 2 is an illustration of an example installed three-dimensional printing system.

FIG. 1 shows an apparatus 10 for regulating pressure in a three-dimensional printer 100. The apparatus 10 comprises a controller 12 configured to receive a value of a measured pressure within the printer 100 and compare the measured pressure value with a predetermined value. The apparatus 10 comprises a connector 14 that is connectable between a gas outlet 102 of the printer 100 and an inlet 202 of an external gas extraction system 200, as shown in FIG. 2. The connector 14 may comprise a gas inlet 16 that may be configured to be connected to the printer gas outlet 102 and may comprise a gas outlet 18 that may be configured to be connected to the extraction system inlet 202 of the external gas extraction system 200. The connector 14 may thereby provide a passage for gas to flow from the printer gas outlet 102 to the extraction system inlet 202.

The apparatus 10 may be configured to stabilise a rate of gas flow from the three-dimensional printer by permitting ambient air to flow into the connector and into the external gas extraction system according to the comparison.

Stabilising the rate of gas flow from the three-dimensional printer may stabilise a pressure within the three-dimensional printer 100, so that the pressure within the three-dimensional printer 100 remains substantially constant, regardless of the extraction rate of the external gas extraction system. This may improve the quality of printed objects.

The three-dimensional printer may comprise a pressure sensor 104, wherein the pressure sensor 104 may be configured to measure a pressure within the three-dimensional printer. In another example, the apparatus 10 may comprise the pressure sensor. The pressure sensor 104 may be provided in an exhaust volume 106 of the three-dimensional printer, for example an exhaust pipe or exhaust chamber. The exhaust volume 106 of the three-dimensional printer may be in fluid connection with the build chamber (not shown), such that a measurement of pressure in the exhaust volume 106 may indicate a pressure in the build chamber. In another example, the pressure sensor 104 may be provided within the build chamber of the three-dimensional printer 100 and may be configured to measure a pressure within the build chamber of the three-dimensional printer 100. In other examples, the pressure sensor may be provided in another volume of the three-dimensional printer.

The controller 12 may be configured to communicate with the pressure sensor 104. The controller may thereby receive measured values of pressure from the pressure sensor 104. The controller 12 may be configured to automatically control the connector 14 to permit ambient air to flow into the connector 14 to stabilise the rate of gas flow from a printer gas outlet of the three-dimensional printer 100 into the external extraction system 200 according to the measured values of pressure from the pressure sensor 104.

The predetermined value may be an optimal pressure within the build chamber of the three-dimensional printer for improving the quality of printed parts. The predetermined value may be an optimal range of pressures within the build chamber of the three-dimensional printer. In other examples, the predetermined value may be an optimal pressure within another volume of the printer. Maintaining a substantially constant pressure within other volumes of the printer may inhibit unwanted gas flows from other volumes of the printer into the build chamber, which may occur if there is a fluctuation in pressure between various volumes of the printer.

The apparatus 10 may be configured to stabilise the rate of gas flow from the three-dimensional printer 100 to maintain a substantially constant pressure in the three-dimensional printer, in the event of a variation in the extraction rate of the external gas extraction system 200. In an example, if the controller 12 determines, based on the comparison, that the measured pressure is lower than the predetermined value, or lower than a lower limit of the range, for example due to the external gas extraction system increasing its extraction rate, the apparatus may be configured permit ambient air to flow into the external gas extraction system, to stabilise the rate of gas flow from the three-dimensional printer into the external gas extraction system. The apparatus may thereby stabilise the pressure in the three-dimensional printer.

In an example, when ambient air is permitted to flow into the external gas extraction system, if the controller 12 determines, based on the comparison, that the measured pressure is higher than the predetermined value, or higher than an upper limit of the range, for example due to the external gas extraction system decreasing its extraction rate, the controller may be configured to decrease the amount of ambient air permitted to flow into the external gas extraction system, to stabilise the rate of gas flow from the three-dimensional printer into the external gas extraction system and thereby stabilise the pressure in the three-dimensional printer.

The apparatus may permit the external extraction system to draw ambient air from outside the three-dimensional printer in addition to the gas from the three-dimensional printer, which may stabilise the amount of gas extracted from the three-dimensional printer. There may be an upper limit to the amount of ambient air permitted to be drawn into the external extraction system and so there may be a limit to the variations in the extraction rate of the external extraction system that may be compensated for. Similarly, if no ambient air is permitted to be drawn into the external extraction system, the apparatus may not be able to compensate for decreases in external extraction system below a lower limit.

Figure 3C:
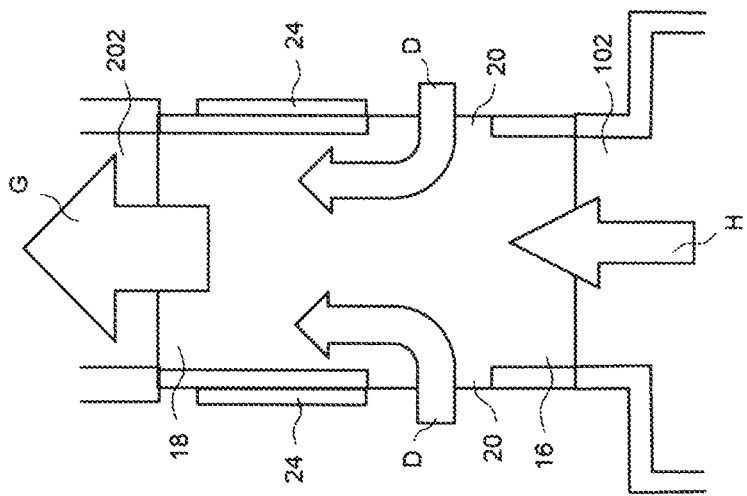
FIGS. 3A, 3B and 3C are section views of part of the installed printing system of FIG. 2.
Figure 3B:
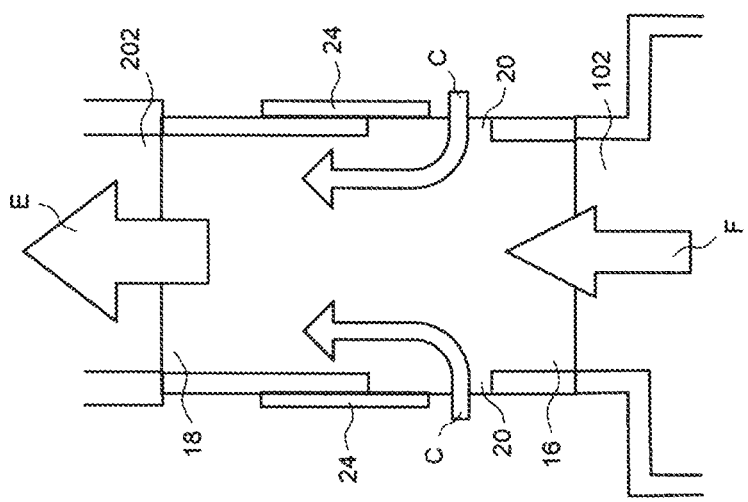
Figure 3A:
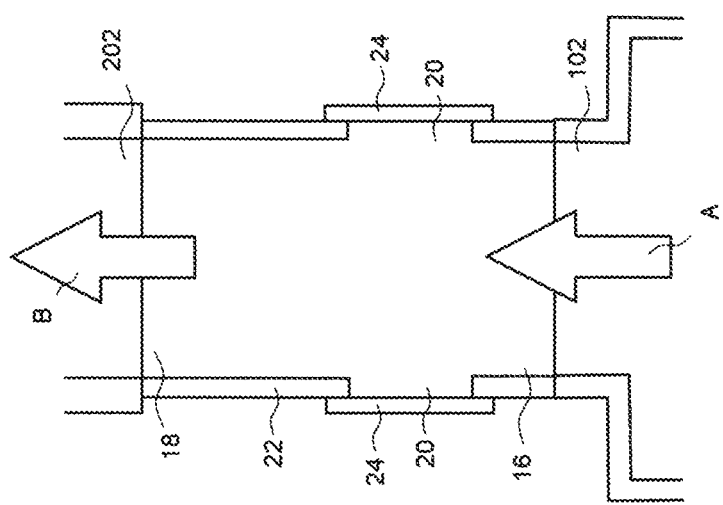

As shown in FIG. 3, the connector 14 may comprise an aperture 20 in a wall 22 of the connector. In one example, the connector 14 may comprise a plurality of apertures 20, for example two apertures 20 as shown in FIGS. 3A, 3B and 3C. The apertures 20 may permit ambient air to flow into the connector 14 from outside the printer 100. The apparatus 10 may be configured to open and close the apertures 20. For example, a cover 24 may cover each aperture 20 to close the respective aperture 20 and the apparatus 10 may be configured to move the cover 24 to open and close the aperture 20, for example using a motor or servo controlled by the controller 12. In another example, a valve, for example an electromechanical valve, may be provided in the connector, the valve providing the aperture and controlling the size of the aperture and whether the aperture is opened or closed. A plurality of valves may be provided in the connector.

When the apertures 20 are closed, gas from the three-dimensional printer 100 may flow through the printer gas outlet 102, through the connector 14 and into the extraction system inlet 202, as indicated by arrows A and B in FIG. 3A. When an aperture 20 is open, ambient air may flow through the aperture 20 into the connector 14 and into the external gas extraction system, as indicated by arrows C and D in FIGS. 3B and 3C.

As indicated in FIGS. 3B and 3C, the apparatus 10 may be configured to compensate for variations in an extraction rate of the external gas extraction system 200. If the extraction rate of the external gas extraction system 200 increases, as indicated by arrow E in FIG. 3B, a pressure in the printer may initially decrease. The pressure sensor 104 may measure this pressure, and the controller may determine that the pressure has decreased based on the comparison between the measured pressure and the predetermined value. The apparatus 10 may move the covers 24 to open the apertures 20 in response to controller 12 determining that the measured pressure in the printer 100 is lower than the predetermined value. Ambient air may thereby be permitted to flow into the connector 14, as shown by arrows C, and the rate of gas flow from the printer gas outlet 102 into the external gas extraction system 200 may be stabilised, as indicated by arrow F in FIG. 3B.

If the extraction rate of the external gas extraction system 200 increases further, as indicated by arrow G in FIG. 3C, the apparatus 10 may increase the amount of ambient air permitted to flow into the connector 14, as indicated by arrows D in FIG. 3C. The amount of ambient air permitted to flow into the connector 14 may be varied by varying the amount by which an aperture 20 is opened by a cover 24.

In the event of variations in the extraction rate of the external gas extraction system, the rate of gas flow from the printer gas outlet 102 into the external gas extraction system 200 can thus be maintained by varying the amount of ambient air permitted to flow into the connector 14 and into the external gas extraction system 200. In another example, the amount of ambient air permitted to flow into the connector 14 may be varied by varying the number of apertures 20 that are opened. In another example, the amount of ambient air permitted to flow into the connector may be varied by varying the size of an aperture of a valve.

The pressure sensor 104 may periodically or continuously measure the pressure in the three-dimensional printer 100 and transmit the measured pressure to the controller 12, and the controller 12 may compare the measured pressure with the predetermined value and may stabilise the pressure in the three-dimensional printer 100 accordingly by controlling the amount of ambient air permitted to flow into the connector, in order to stabilise the rate of gas flow and pressure within the printer 100. The apparatus 10 may thereby adaptively control the pressure in the three-dimensional printer 100 based on live feedback from the pressure sensor 104.

For example, the controller 12 may control the aperture 20 to open by a first amount according to a first measured pressure in the three-dimensional printer 100. After the aperture 20 has been opened by the first amount, the pressure sensor 104 may measure the pressure in the printer 100 and may transmit a second measured pressure value to the controller 12. The controller 12 may compare the second measured pressure value with the predetermined pressure value and may the control the aperture 20 to open further, or be open less, according to the comparison. In this way, the controller 14 may be configured to automatically adjust the rate of gas flow from the three-dimensional printer 100 according to feedback from the pressure sensor 104 to maintain the internal gas flow and pressure within the printer to be substantially constant.

The three-dimensional printer 100 may comprise a printer air inlet, comprising a fan (not shown). The printer air inlet may be configured to draw ambient air into the three-dimensional printer by operation of the fan. The apparatus 10 may reduce fan failures that may occur if the fan operates at higher speeds to compensate for the external extraction system 200 operating at a high extraction rate.

In another example, the apparatus may be installed within a main body of the three-dimensional printer, wherein the main body of the three-dimensional printer may comprise controllable openings to allow ambient air to flow into the connector of the apparatus.

Figure 4:
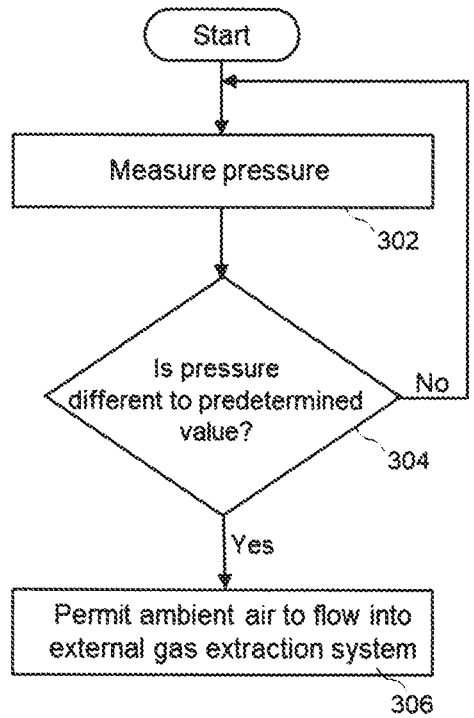
FIG. 4 is a flow chart of an example method.

FIG. 4 shows a flowchart of an example method. The method may be executable by the apparatus 10 and three-dimensional printer 100 shown in FIG. 2.

The method comprises, in block 302, measuring a pressure in the three-dimensional printer.

The method comprises, in block 304, comparing the measured pressure with a predetermined value. In another example, the method may comprise comparing the measured pressure with a predetermined pressure range.

If the measured pressure is determined to be the predetermined value, or be within the predetermined pressure range, it may be determined that the pressure within the three-dimensional printer is at a desired pressure and stabilisation of the pressure is not required.

If the measured pressure is determined to be different from the predetermined value, or outside of the predetermined pressure range, the method comprises, in block 306, stabilising the pressure in the three-dimensional printer. Stabilising the pressure in the three-dimensional printer comprises permitting ambient air to flow into the external gas extraction system. Allowing ambient air to flow into the external gas extraction system may comprise opening an aperture in a connector provided between the printer and the external gas extraction system.

When the ambient air is permitted to flow into the external gas extraction system, the method in blocks 302 and 304 may be repeated to determine if a subsequent, second measured pressure value is different to the predetermined value, or outside the predetermined pressure range. If the measured pressure still deviates from the predetermined value or range, the amount of ambient air permitted to flow into the external gas extraction system may be adjusted. The method may be repeated until the measured pressure is equal to the predetermined value or within the predetermined range.

The method of FIG. 4 may be repeated periodically, in order to stabilise the pressure in the event of any change in the external gas extraction system. A three-dimensional printing process can take several hours, and the method may stabilise pressure within the three-dimensional printer in the event of a disruption to the external gas extraction system or a variation in suction of the external gas extraction system over the time of the printing process. This may reduce system errors in the printer due to unexpected changes in the external customer extraction system and thereby improve yield of printed objects.

Figure 5:
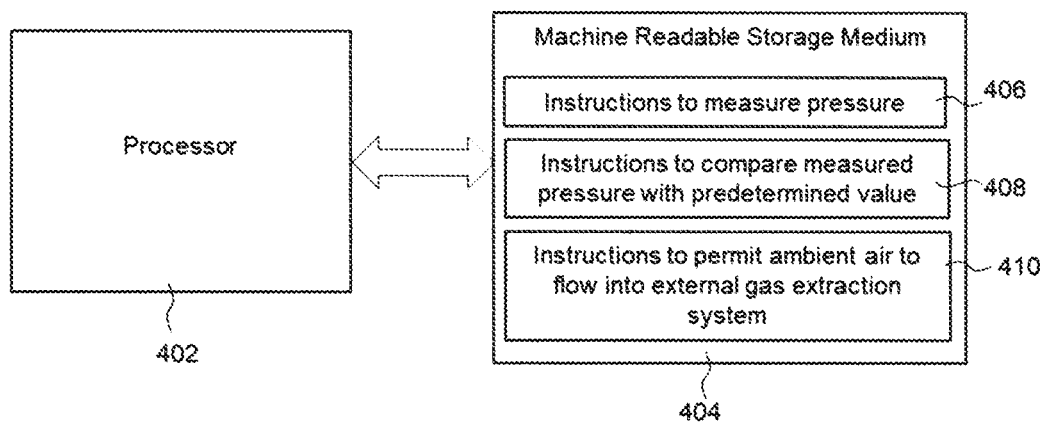
FIG. 5 is a block diagram of an example of a machine-readable medium in association with a processor.

Various elements and features of the method described herein may be implemented through execution of machine-readable instructions by a processor. FIG. 5 shows a processing system comprising a processor 402 in association with a non-transitory machine-readable storage medium 404. The machine-readable storage medium 404 may be a tangible storage medium, such as a removable storage unit or a hard disk installed in a hard disk drive. The machine-readable storage medium comprises instructions at box 406 to measure a pressure within a three-dimensional printer.

The machine-readable storage medium comprises instructions at box 408 to compare the measured pressure with a predetermined pressure value. The instructions to compare the measured pressure with a predetermined pressure value may comprise instructions to determine whether the measured pressure is higher or lower than the predetermined pressure value or outside a predetermined pressure range.

The machine-readable storage medium comprises instructions at box 410 to permit ambient air to flow into an external gas extraction system, if the measured pressure is different to the predetermined pressure value.

The instructions to permit ambient air to flow into the external gas extraction system may comprise instructions to adjust the amount of ambient air permitted to flow into the external gas extraction system. The instructions to adjust the amount of ambient air permitted to flow into the external gas extraction system may comprise instructions to increase the amount of ambient air permitted to flow into the external gas extraction system if the measured pressure is determined to be lower than the predetermined pressure value. The instructions to adjust the amount of ambient air permitted to flow into the external gas extraction system may comprise instructions to decrease the amount of ambient air permitted to flow into the external gas extraction system if the measured pressure is determined to be higher than the predetermined pressure value.

According to examples described herein, a pressure within a three-dimensional printer may be regulated by an apparatus that controls an amount of ambient air permitted to flow into an external gas extraction system, to compensate for irregularities in suction from the external gas extraction system. This may improve the quality and repeatability of printed objects, because the pressure and gas flow conditions within the printer may be constant. In addition, the pressure within the printer may not be affected by variations in external gas extraction systems across different sites.

The invention claimed is:

1. An apparatus for regulating pressure, the apparatus comprising: a connector that is connectable between a gas outlet of a three-dimensional printer and an inlet of an external gas extraction system having a variable extraction rate, the connector having a cover that covers an aperture in a wall of the connector; and a controller configured to: receive a value of a pressure measured by a sensor located in an exhaust volume within the three-dimensional printer; compare the valve of the pressure to a predefined range of optimal pressure values; and when the value of the measured pressure is outside of the predefined range of optimal pressure values, control the cover of the connector to permit ambient air to flow into the connector to stabilize a flow rate from the gas outlet of the three-dimensional printer into the external extraction system by varying an amount by which the aperture located in the wall of the connector is opened to compensate for the variable extraction rate.

2. The apparatus of claim 1, the sensor comprising a pressure sensor configured to measure a value of pressure within the three-dimensional printer.

3. The apparatus of claim 1, the controller configured to automatically control the connector to permit ambient air to flow into the external extraction system based on a plurality of values of pressures measured within the three-dimensional printer.

4. The apparatus of claim 1, wherein the aperture is configured to permit ambient air to flow from outside the three-dimensional printer into the external gas extraction system, and wherein the controller is configured to open and close the aperture by the varying amount using the cover to control whether the ambient air is permitted to flow from outside the three-dimensional printer into the external gas extraction system.

5. The apparatus of claim 4, wherein the aperture comprises a plurality of apertures, and the controller is configured to control which of the plurality of apertures are opened and which of the plurality of apertures are closed to control the ambient air permitted to flow from outside the three-dimensional printer into the external gas extraction system.

6. A method comprising: measuring, by a sensor, a pressure in a three-dimensional printer connected to an external gas extraction system via a connector, the sensor located in an exhaust volume within the three-dimensional printer; comparing the pressure to a predefined range of optimal pressure values; and when the measured pressure is outside of the predefined range of optimal pressure values, controlling a cover to permit ambient air to flow into the connector to stabilize a flow rate from an outlet of the three-dimensional printer into the external gas extraction system by varying an amount by which an aperture covered by the cover and located in a wall of the connector is opened to compensate for a variable extraction rate of the external gas extraction system.

7. The method of claim 6, further comprising:
measuring the pressure in the three-dimensional printer after permitting ambient air to flow into the connector; and
comparing the measured pressure with the predefined range of optimal pressure values; and
when the measured pressure is outside of the predefined range of optimal pressure values, adjusting the amount of ambient air permitted to flow into the external gas extraction system.

8. The method of claim 6, further comprising controlling the amount of ambient air flow allowed to flow into the external gas extraction system.

9. A non-transitory machine-readable storage medium encoded with instructions executable by a processor, the machine-readable storage medium comprising: instructions to measure, via a sensor, a pressure within a three-dimensional printer connected to an external gas extraction system via a connector, the sensor located in an exhaust volume within the three-dimensional printer; instructions to compare the pressure to a predefined range of optimal pressure values; and instructions to, when the measured pressure is outside of the predefined range of optimal pressure values, control a cover to permit ambient air to flow into the connector to stabilize a flow rate from an outlet of the three-dimensional printer into an external gas extraction system by varying an amount by which an aperture covered by the cover and located in a wall of the connector is opened to compensate for a variable extraction rate of the external gas extraction system.

10. A non-transitory machine-readable storage medium in accordance with claim 9, wherein the instructions control the cover to stabilize the flow rate of ambient air comprises instructions to increase the amount of ambient air permitted to flow into the external gas extraction system if the measured pressure is determined to be lower than the predefined range of optimal pressure values, wherein the increase assists to stabilize the flow rate and compensate for the variable extraction rate of the external gas extraction system.

11. A non-transitory machine-readable storage medium in accordance with claim 9, wherein the instructions control the cover to stabilize the flow rate of ambient air comprises instructions to decrease the amount of ambient air permitted to flow into the external gas extraction system if the measured pressure is determined to be higher than the predefined range of optimal pressure values, wherein the decrease to stabilize the flow rate and compensate for the variable extraction rate of the external gas extraction system.

* * * * *